(12) United States Patent
Kincaid et al.

(10) Patent No.: US 11,660,641 B2
(45) Date of Patent: May 30, 2023

(54) SEMI-AUTOMATED BULK SORTING SYSTEM AND ASSOCIATED METHODS

(71) Applicant: DESIGNED CONVEYOR SYSTEMS, LLC, Franklin, TN (US)

(72) Inventors: Curt Kincaid, Spring Hill, TN (US); Matthew Caldwell, Jonesboro, AR (US); Matthew Ferguson, College Grove, TN (US)

(73) Assignee: DESIGNED CONVEYOR SYSTEMS, LLC, Franklin, TN (US)

( * ) Notice: Subject to any disclaimer, the term of this patent is extended or adjusted under 35 U.S.C. 154(b) by 125 days.

(21) Appl. No.: 17/193,256

(22) Filed: Mar. 5, 2021

(65) Prior Publication Data
US 2021/0276047 A1  Sep. 9, 2021

Related U.S. Application Data

(60) Provisional application No. 62/986,068, filed on Mar. 6, 2020.

(51) Int. Cl.
*B07C 3/08* (2006.01)
*B65G 47/46* (2006.01)
*B07C 3/00* (2006.01)
*B65G 47/82* (2006.01)

(52) U.S. Cl.
CPC .............. *B07C 3/08* (2013.01); *B07C 3/008* (2013.01); *B65G 47/46* (2013.01); *B65G 47/82* (2013.01); *B65G 2201/0285* (2013.01)

(58) Field of Classification Search
CPC ..... B07C 7/00–004; B07C 3/08; B07C 3/008; B65G 47/44; B65G 47/46; B65G 47/82; B65G 2201/0285
See application file for complete search history.

(56) References Cited

U.S. PATENT DOCUMENTS

| | | |
|---|---|---|
| 3,955,680 A | 5/1976 | Botula |
| 4,130,480 A | 12/1978 | Loewenthal |
| 6,715,599 B1 | 4/2004 | Fortnebery et al. |
| 10,022,752 B1 * | 7/2018 | Rothermel ................ B07C 3/08 |
| 2003/0116479 A1 | 6/2003 | Morito |
| 2021/0237987 A1 * | 8/2021 | Li ............................ B07C 3/20 |

* cited by examiner

*Primary Examiner* — Michael McCullough
*Assistant Examiner* — Jessica L Burkman
(74) *Attorney, Agent, or Firm* — Allen, Dyer et al.

(57) ABSTRACT

A semi-automated bulk sorting system includes a primary conveyor having a proximate end and a distal end, where the proximate end of the primary conveyor is configured for collecting outbound parcels and cartons that are to be sorted. The system includes a manual sort center coupled downstream from the primary conveyor and configured to partially sort the parcels and cartons. A parcel final sortation zone is coupled downstream from the manual sort center for receiving the partially sorted parcels and is configured to finally sort the parcels for delivery. In addition, the system includes a plurality of carton palletization zones coupled downstream from the manual sort center for receiving the sorted cartons and to palletize the sorted cartons for delivery.

18 Claims, 7 Drawing Sheets

SEMI-AUTOMATED BULK SORTING SYSTEM AND ASSOCIATED METHODS

CROSS-REFERENCE TO RELATED APPLICATIONS

This application claims the benefit of U.S. provisional application No. 62/986,068 filed Mar. 6, 2020, which is hereby incorporated herein in its entirety by reference.

FIELD

The present invention relates to the field of package sorting system, and, more particularly, to a semi-automated bulk sorting system and associated methods.

BACKGROUND

Distribution centers face challenges to sort thousands of orders shipped in a variety of parcel types, including cartons, polybags, and mailers. These challenges also include the difficulty in efficiently handling and controlling the diversity of packaging to meet carrier preferences, which can increase costs.

There is therefore a need for an improved system and method for sorting, which allows for increased efficiency to meet carrier preferences and at the same time is more cost effective.

SUMMARY

A semi-automated bulk sorting system is disclosed. The system includes a primary conveyor having a proximate end and a distal end, where the proximate end of the primary conveyor is configured for collecting outbound parcels and cartons that are to be sorted. The system includes a manual sort center coupled downstream from the primary conveyor and configured to partially sort the parcels and cartons. A parcel final sortation zone is coupled downstream from the manual sort center for receiving the partially sorted parcels and is configured to finally sort the parcels for delivery. In addition, the system includes a plurality of carton palletization zones coupled downstream from the manual sort center for receiving the sorted cartons and to palletize the sorted cartons for delivery.

In another particular aspect, a sorting center for sorting outbound parcels and cartons is disclosed. The sorting center includes a center walkway, a plurality of sorting stations elevated from the center walkway, and a plurality of infeed chutes for automatically diverting the outbound parcels and cartons down one of the plurality of infeed chutes to a designated sorting station. The sorting center also includes a plurality of takeaway chutes coupled to a plurality of conveyors and each conveyor terminates at a plurality of carton palletization zones. The plurality of takeaway chutes have upper ends adjacent to the plurality of sorting platforms and lower ends feeding the plurality of conveyors. In addition, the plurality of sorting platforms are positioned for a sorter to manually move the cartons from a respective sorting platform and down one of the plurality of takeaway chutes.

In another particular aspect a method of manufacturing a semi-automated bulk sorting system is disclosed. The method includes providing a primary conveyor having a proximate end and a distal end, where the proximate end of the primary conveyor is configured for collecting outbound parcels and cartons that are to be sorted. The method also includes coupling a plurality of infeed chutes between the distal end of the primary conveyor and a plurality of sorting stations in series along the primary conveyor with each infeed chute having an upper end connected along the primary conveyor and a lower end terminating at a designated sorting station of a plurality of sorting stations.

The method includes positioning a first takeaway chute of a plurality of takeaway chutes forward on a first side of the designated sorting station, positioning a second takeaway chute forward on a second side of the designated sorting station, positioning a third takeaway chute rearward on the first side of the designated sorting platform, positioning a fourth takeaway chute rearward on the second side of the designated sorting station, and positioning a small sorts lane above and forward of the plurality of sorting stations. In addition, the method includes positioning a plurality of carton palletization zones downstream from the plurality of takeaway chutes and being configured to receive the sorted cartons via a respective conveyor in order to palletize the sorted cartons for delivery by a designated carrier.

Other aspects, advantages, and features of the present disclosure will become apparent after review of the entire application, including the following sections: Brief Description of the Drawings, Detailed Description, and the Claims.

BRIEF DESCRIPTION OF THE DRAWINGS

The aspects and the attendant advantages of the embodiments described herein will become more readily apparent by reference to the following detailed description when taken in conjunction with the accompanying drawings wherein.

DETAILED DESCRIPTION

In the following detailed description, preferred embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention. Like numbers refer to like elements throughout.

Figure 1:
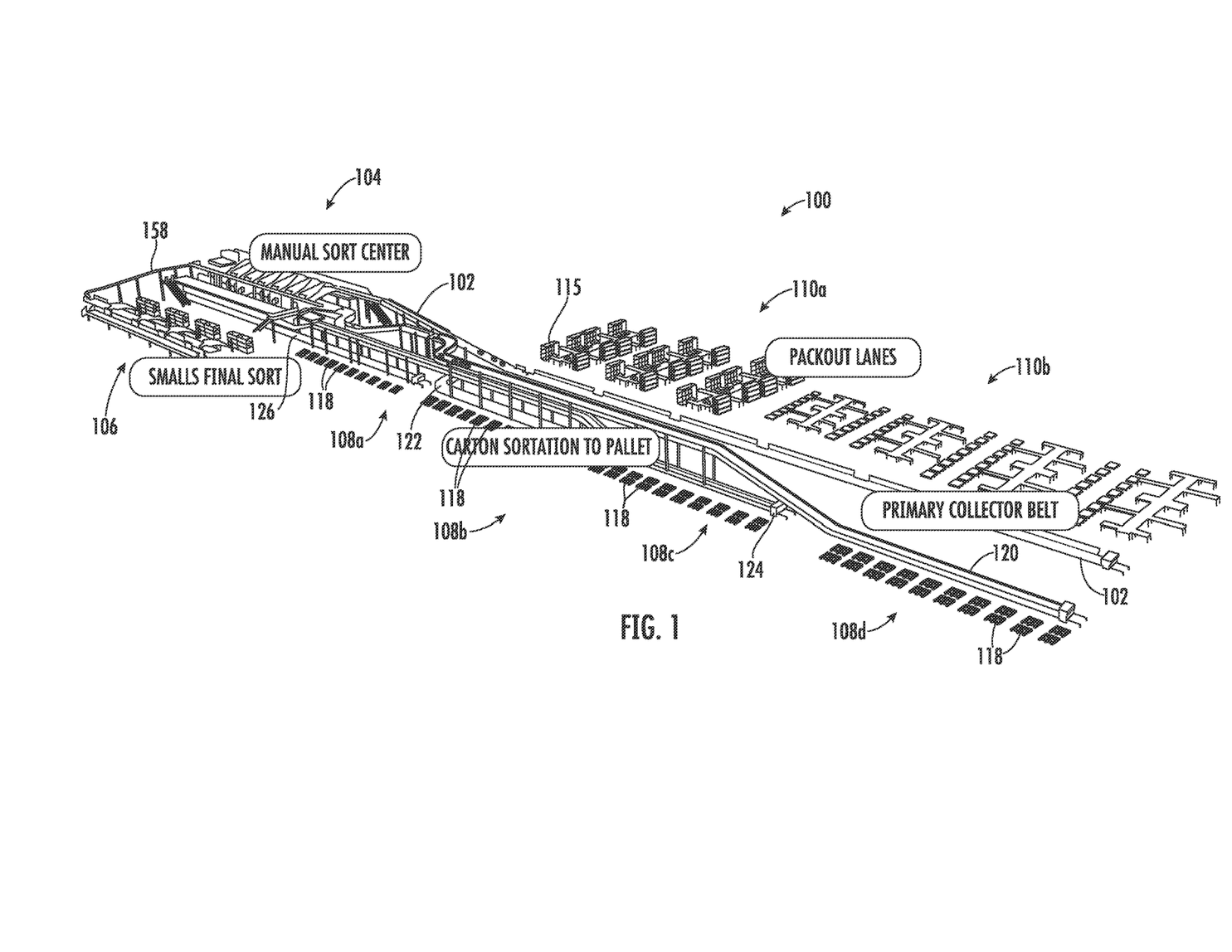
FIG. 1 is a perspective view of a semi-automated bulk sorting system in accordance with particular aspects of the invention disclosed herein.

A semi-automated bulk sorting system is disclosed herein that is engineered specifically to more affordably address the challenges associated with high-volume order fulfillment of multiple outbound parcel formats. Referring now to FIG. 1, the system, generally designated 100, addresses the challenges faced by distribution centers seeking to sort thousands of orders shipped in a variety of parcel types, including cartons, polybags, and mailers. Not only does successfully handling and controlling the diversity of packaging require a uniquely engineered solution, effective pre-sorting to meet carrier preferences can also yield a significant reduction in shipping costs.

The system 100 increases the efficiency of a labor workforce to sort a huge variety of outbound parcel sizes, shapes and weights at rates up to 18,000 packages per hour, for example. The system 100 accommodates controlled routing of cartons destined for outbound palletization, either manual or automated, and of small packages, like polybags and mailers, for sorting into pre-designated carrier route bulk bags.

To address the range of packaging types, the system 100 may include up to five discrete areas. For example, this may include 1) a manual sort center 104, 2) a parcel final sortation zone 106 for small parcels, optionally equipped with light-directed put walls, 3) a plurality of manual pack-out lanes 110a, 110b outfitted with both light-directed put walls 115 and workstations, 4) a primary conveyor 102, and 5) a plurality of carton palletization zones 108a-d across carrier-specific lanes that can be optionally equipped with scan-based, light-directed put indicators.

To address support spikes in response to order volumes both daily and seasonally, each zone of the system 100 is modularly configurable for use as needed. This allows management to add or change sort positions on-the-fly and reallocate their permanent or temporary workforce to better manage throughput surges. The flexibility of the system 100 negates the need for complicated scanning and routing systems. That further reduces the overall capital investment required to achieve this high degree of throughput. With this system 100, parcel fulfillment shippers benefit from the ability to flex their resources, both equipment and personnel, as needed to keep pace with end customer expectations.

The outbound sortation system 100 can be coupled via a warehouse control system (WCS) to an operation's existing warehouse management system (WMS) if desired. However, not every facility needs, or wants, extensively deep integration with their WMS. Accordingly, the system 100 has the ability to be up and running in three to six months, from concept to commissioning, depending on the degree of put-to-light technologies and IT integration requested.

The primary conveyor 102 has a proximate end where cartons 112 and parcels 114 can be loaded and they begin to move through the system 100. The primary conveyor 102 is relatively horizontal and at a height that allows the cartons 112 and parcels 114 to be loaded manually. The primary conveyor 102 is configured for buffering and accumulating the outbound parcels and cartons. The primary conveyor 102 transports the cartons 112 and parcels 114 to a distal end of the primary conveyor 102. The distal end of the primary conveyor 102 may be elevated relative to the proximate end. As those of ordinary skill in the art can appreciate, the primary conveyor uses a motorized belt or similar means in order to transport the cartons 112 and parcels 114 along the primary conveyor 102.

The manual sort center 104 is positioned downstream from the primary conveyor 102 and is configured to efficiently sort the parcels 114 and cartons 112. The manual sort center 104 is where the cartons 112 are sorted according to a first criteria. For example, the criteria may typically be to sort the cartons 112 according to the carrier. The smaller parcels 114 are sorted from the cartons 112 and transported to the parcel final sortation zone 106 positioned downstream from the manual sort center 104. The parcel final sortation zone 106 receives the partially sorted parcels via a parcel conveyor 158 where the parcels 114 are finally sorted for delivery.

The cartons 112 are sorted and separated from the smaller parcels 114 so that they can be transported to the plurality of carton palletization zones 108a, 108b, 108c, 108d coupled downstream from the manual sort center 104. The carton palletization zones 108a-d are configured for receiving the sorted cartons 112 and to pack the sorted cartons 112 on pallets 118 for delivery.

The manual sort center 104 comprises a plurality of takeaway chutes 144, 146, 148, 150 with each coupled to a plurality of conveyors 120, 122, 124, 126 and each conveyor terminates at a designated carton palletization zone 108a, 108b, 108c, 108d.

Figure 2:
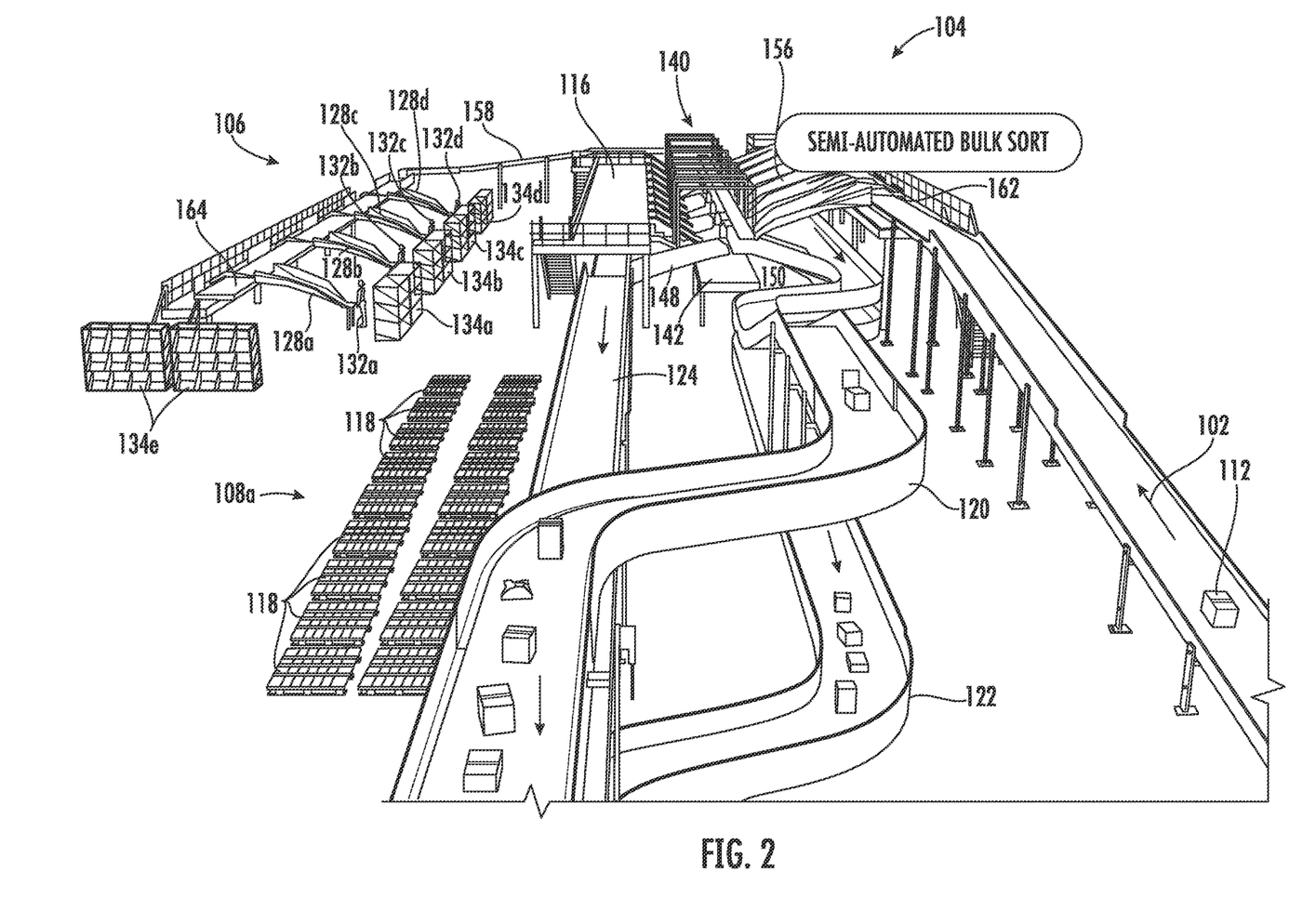
FIG. 2 is a perspective view of a manual sort center of the system of FIG. 1.

Referring now to FIG. 2, the manual sort center 104 includes a plurality of infeed chutes 156 coupled between the primary conveyor 102 and a plurality of sorting stations 140. An access walkway 116 is used for the sorters 130 to reach a particular sorting station 140.

The outbound cartons 112 and parcels 114 are automatically diverted down one of the plurality of infeed chutes 156 using a respective diverter arm 162. The plurality of infeed chutes 156 are connected in series along the primary conveyor 102 and each infeed chute 156 has an upper end 154 connected along the primary conveyor 102 and a lower end 152 terminating at a designated sorting station 140. The infeed chutes 156 have a downward sloping angle so that the cartons 112 and parcels 114 gently slide down to the designated sorting station 140.

Still referring to FIG. 2, the parcel final sortation zone 106 for small parcels receives parcels 114 via the parcel conveyor 158. The parcels 114 are diverted down one of the parcel infeed chutes 128a-d to a parcel sorter 132a-d by a parcel diverter arm 164. The parcel final sortation zone 106 may include both light-directed put walls 134a-e and workstations.

Figure 3:
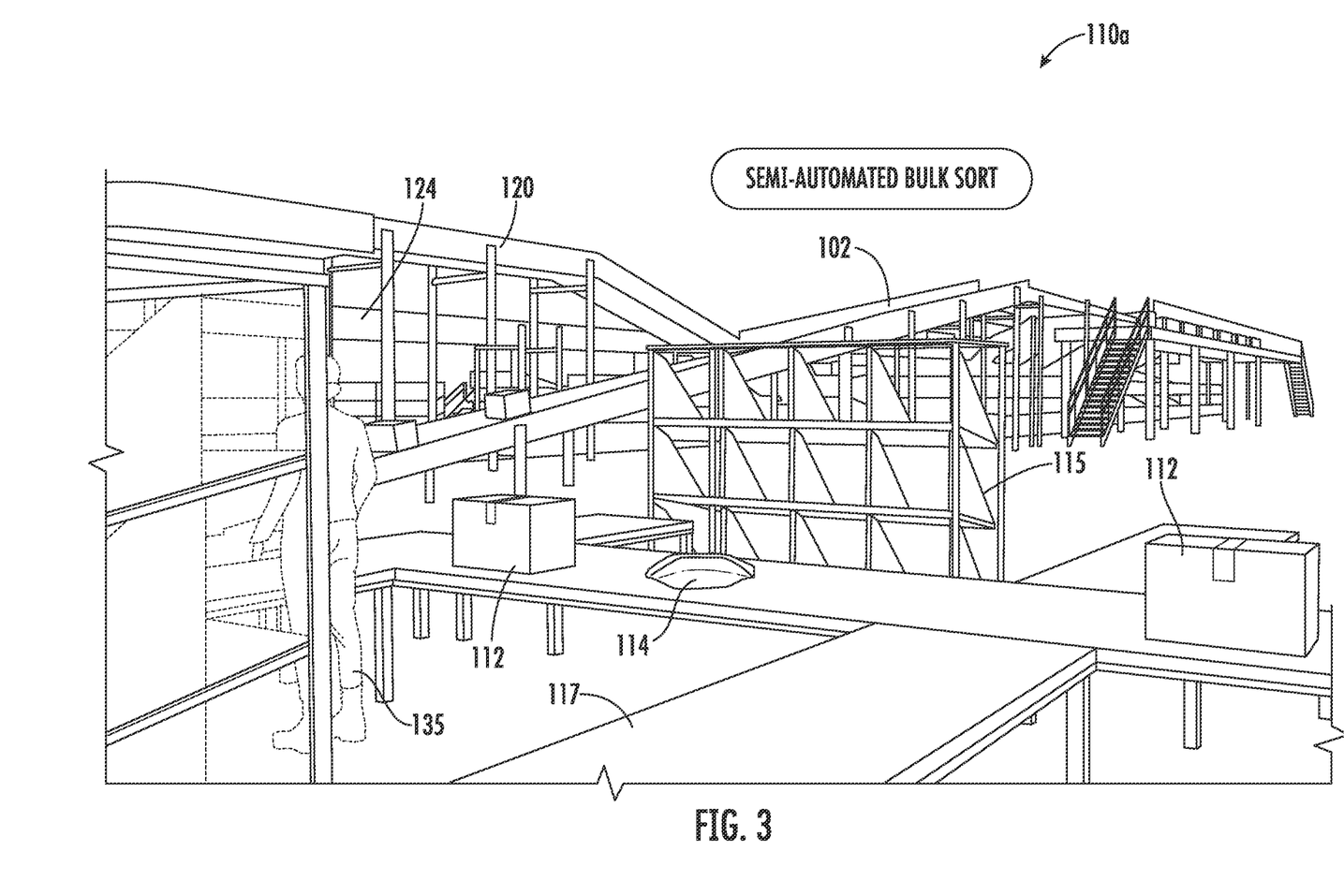
FIG. 3 is a perspective view of the manual pack-out lanes of the system of FIG. 1.

Referring now to FIG. 3, pack-out lanes 110a are typically outfitted with both light-directed put walls 115 and workstations 117 for use by a packer 135. The pack-out lanes 110a, 110b are positioned adjacent to the primary conveyor 102 for efficient loading of the cartons 112 and parcels 114 for sorting.

Figure 4:
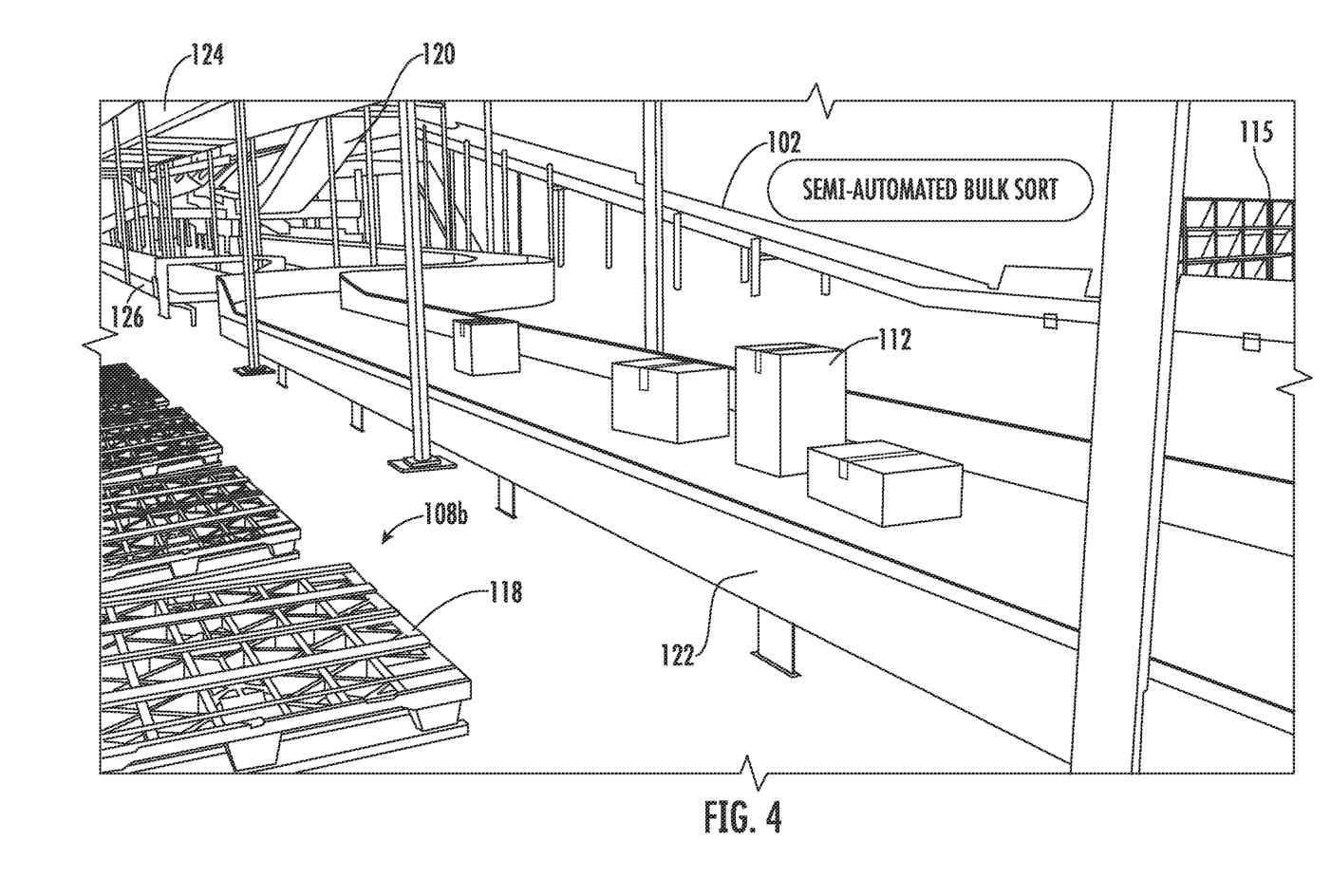
FIG. 4 is a perspective view of a carton palletization zone of FIG. 1.

The carton palletization zone 108a-d is positioned on an opposing side of the primary conveyor 102 from the pack-out lanes 110a, 110b described above. For example as shown in FIG. 4, the carton palletization zone 108b is positioned adjacent to the second conveyor 122 so that the sorted cartons 112 can be efficiently packed on the pallets 118. The carton palletizations zones 108a-d may be carrier-specific lanes that can be optionally equipped with scan-based, light-directed put indicators.

Figure 5:
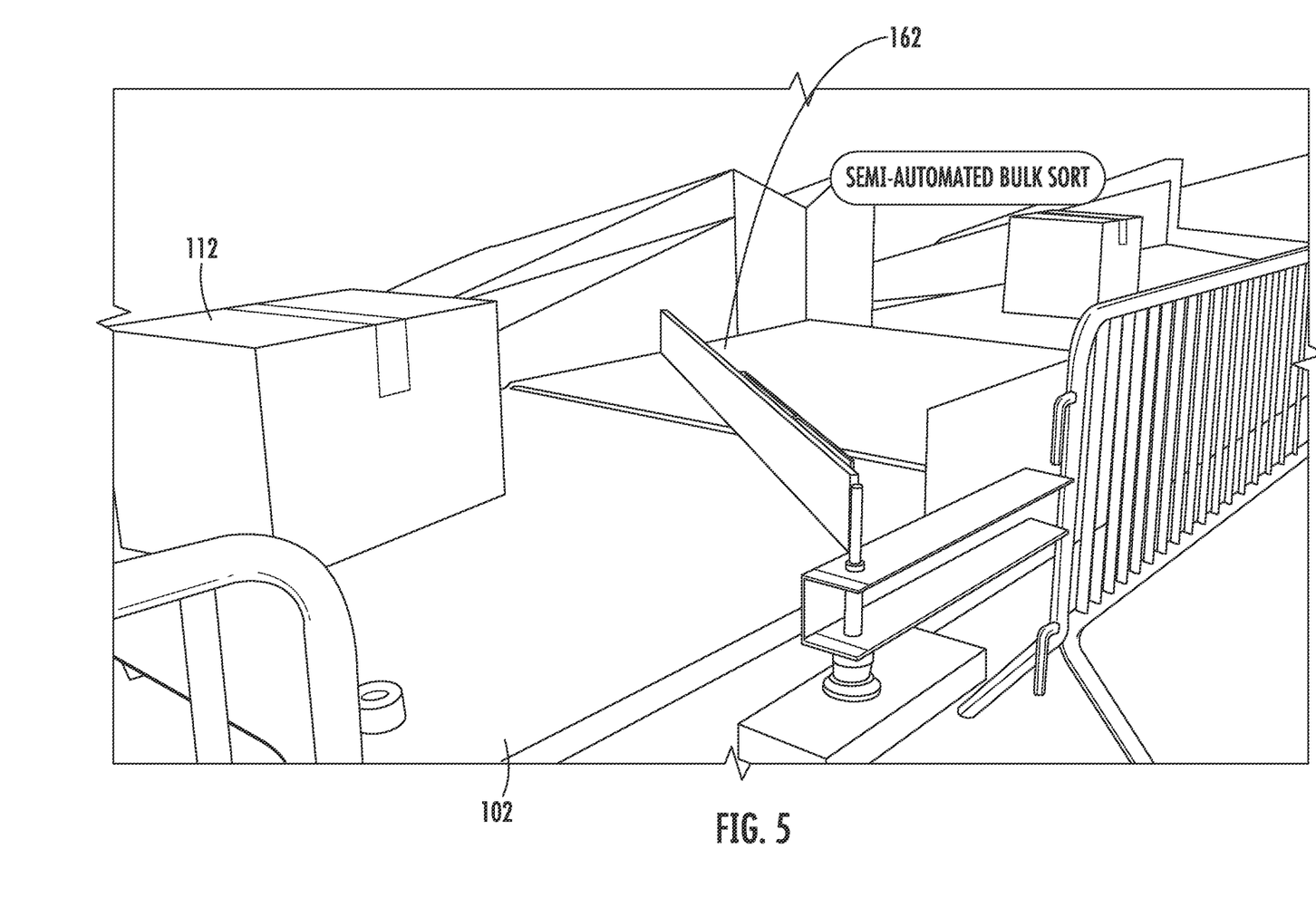
FIG. 5 is a perspective view of a diverter arm of the system of FIG. 1.

Referring now to FIG. 5, a plurality of automated diverter arms 162 may be proximate to the distal end of the primary conveyor 102 and configured to alternatingly divert parcels and cartons down to a designed sorting platform 106 of the plurality of sorting platforms. Accordingly, during high volume all the diverter arms 162 may be directing all the sorting stations 140 to receive cartons 112 and parcels 114 for sorting. However, when volume is low, the diverter arms 162 may be programmed so that a less number of sorting stations 140 are receiving cartons 112 and parcels 114 for sorting, which in turn requires less labor and reduced costs.

Figure 6:
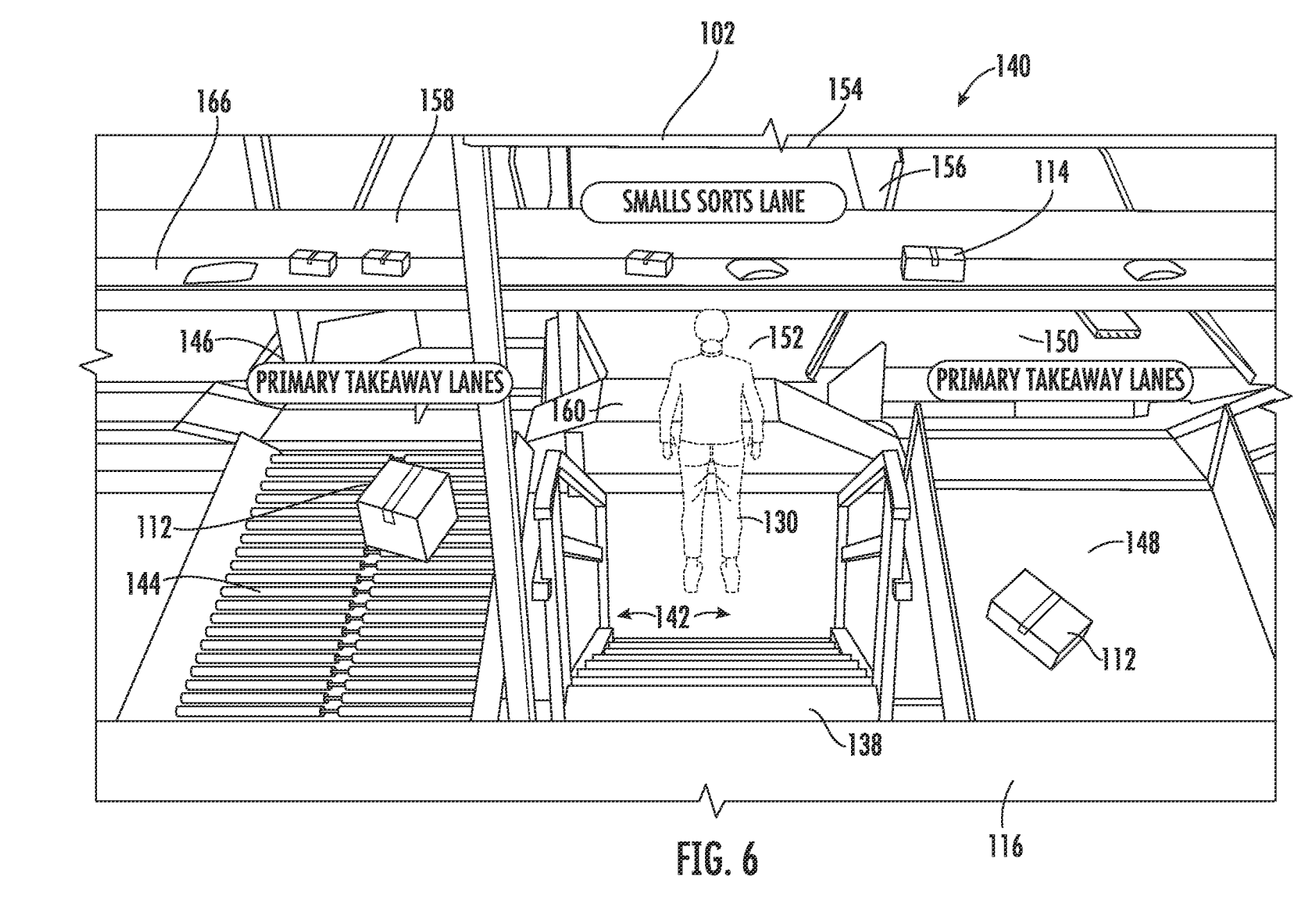
FIG. 6 is a perspective view of a sort station of the manual sort center of FIG. 1.
Figure 7:
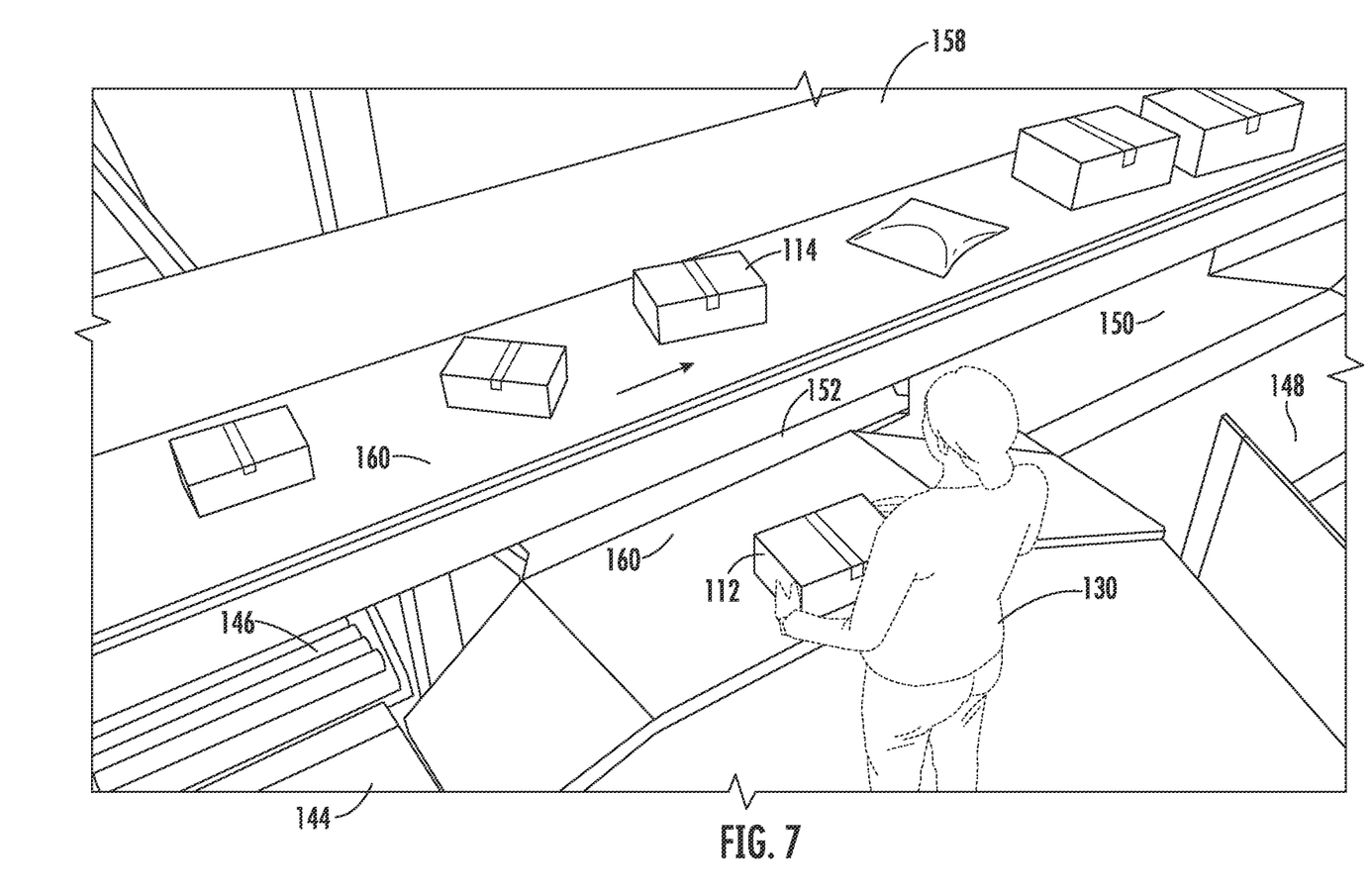
FIG. 7 is a detailed view of a sorting platform and the take-away lanes of the manual sort center of FIG. 6.

Referring now to FIGS. 6 and 7, the manual sort center 140 includes an elevated center walkway 142 that is accessed via stairway 138. A plurality of sorting platforms 160 are elevated from the center walkway 142 at a height that is comfortable for the sorter 130 to sort the cartons 112 and parcels 114. The plurality of takeaway chutes 144, 146, 148, 150 have upper ends adjacent to the plurality of sorting platforms 160 and lower ends feeding the plurality of conveyors 120, 122, 124, 126. The plurality of sorting platforms 160 are positioned for a sorter 130 to manually move the cartons 112 from a respective sorting platform 160 and slide the cartons 112 down one of the plurality of takeaway chutes 144, 146, 148, 150.

The first takeaway chute 144 is positioned forward on a first side of the sorting platform 160 and a second takeaway chute 146 is positioned forward on a second side of the sorting platform 160. The third takeaway chute 148 is positioned rearward on the first side of the sorting platform 160 and a fourth takeaway chute 150 is positioned rearward on the second side of the sorting platform 160.

In addition, the manual sort center 104 includes a small sorts lane 166 positioned above and forward of the plurality of sorting platforms 160. The small sorts lane 166 transports parcels 114 to the parcel final sortation zone 106 via the parcel conveyor 158.

For example, a first set of cartons can be sorted to the first takeaway chute 144 and transported to the first carton palletization zone 108a via the first conveyor 126, and a second set of cartons can be sorted to the second takeaway chute 146 and transported to the second carton palletization zone 108b via the second conveyor 122. Similarly, a third set of cartons can be sorted to the third takeaway chute 148 and transported to the third carton sortation zone 108c via a third conveyor 124, and a fourth set of cartons can be sorted to the fourth takeaway chute 150 and transferred to a fourth carton sortation zone 108d via the fourth conveyor 120.

The first conveyor 126 and the second conveyor 122 may be aligned vertically as they leave the manual sort center 104, and the third conveyor 124 and the fourth conveyor 120 may likewise be aligned vertically as they leave the manual sort center 104. Each of the takeaway chutes 144, 146, 148, 150 may be positioned perpendicular to a respective conveyor.

In addition, a method of sorting using a semi-automated bulk sorting system that includes a primary conveyor 102 having a proximal end and a distal end, where the proximal end of the primary conveyor 102 is configured for collecting outbound parcels 114 and cartons 112 that are to be sorted. A plurality of infeed chutes 156 are coupled between the distal end of the primary conveyor 102 and a plurality of sorting stations 140 in series along the primary conveyor 102 with each infeed chute 156 having an upper end connected along the primary conveyor 102 and a lower end terminating at a designated sorting station 140 of the plurality of sorting stations.

A first takeaway chute 144 of a plurality of takeaway chutes is positioned forward on a first side of the designated sorting station, a second takeaway chute 146 is positioned forward on a second side of the designated sorting station, a third takeaway chute 148 is positioned rearward on the first side of the designated sorting platform, a fourth takeaway chute 150 is positioned rearward on the second side of the designated sorting station. A small sorts lane 166 is positioned above and forward of the plurality of sorting stations 140. In addition, a plurality of carton palletization zones 108a-d are positioned downstream from the plurality of takeaway chutes and configured to receive the sorted cartons via a respective conveyor 120, 122, 124, 126, in order to palletize the sorted cartons for delivery by a designated carrier. The method includes receiving a plurality of parcels at the plurality of sorting stations, and moving each of the plurality of parcels to one of the plurality of takeaway chutes or the small sorts lane conveyor.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope possible consistent with the principles and novel features as defined herein.

That which is claimed is:

1. A semi-automated bulk sorting system comprising:
   a primary conveyor having a proximal end and a distal end, the proximal end of the primary conveyor configured for collecting outbound parcels and cartons that are to be sorted;
   a manual sort center coupled downstream from the primary conveyor and having a plurality of sorting platforms, wherein each of the sorting platforms has a plurality of takeaway chutes with upper ends adjacent to the plurality of sorting platforms and a small sorts lane positioned above and forward of the plurality of sorting platforms;
   a parcel final sortation zone coupled downstream from the manual sort center for receiving the partially sorted parcels and configured to finally sort the parcels for delivery; and
   a plurality of carton palletization zones coupled downstream from the manual sort center for receiving the sorted cartons and to palletize the sorted cartons for delivery.

2. The system of claim 1, wherein the manual sort center comprises a a plurality of conveyors and each conveyor terminates at a designated carton palletization zone.

3. The system of claim 1, wherein the primary conveyor is configured for buffering and accumulating the outbound parcels and cartons before transporting to the manual sort center.

4. The system of claim 2, wherein the manual sort center comprises a plurality of infeed chutes coupled between the primary conveyor and a plurality of sorting stations, and outbound parcels and cartons are automatically diverted down one of the plurality of infeed chutes.

5. The system of claim 4, wherein the plurality of infeed chutes is connected in series along the primary conveyor and each infeed chute has an upper end connected along the primary conveyor and a lower end terminating at a designated sorting station.

6. The system of claim 5, wherein the manual sort center comprises a center walkway and the plurality of sorting platforms are elevated from the center walkway.

7. The system of claim 6, wherein the plurality of takeaway chutes have lower ends feeding the plurality of conveyors.

8. The system of claim 7, wherein the plurality of takeaway chutes comprises a first takeaway chute positioned forward on a first side of the sorting platform and a second takeaway chute positioned forward on a second side of the sorting platform.

9. The system of claim 8, wherein the plurality of takeaway chutes comprises a third takeaway chute positioned rearward on the first side of the sorting platform and a fourth takeaway chute positioned rearward on the second side of the sorting platform.

10. The system of claim 1, wherein the small sorts lane transports parcels to the parcel final sortation zone via a parcels conveyor.

11. The system of claim 9, wherein a first set of cartons are sorted to the first takeaway chute and transported to a first carton palletization zone via a first conveyor, and a second set of cartons are sorted to the second takeaway chute and transported to a second carton palletization zone via a second conveyor.

12. The system of claim 11, wherein a third set of cartons are sorted to the third takeaway chute and transported to a third carton sortation zone via a third conveyor, and a fourth set of cartons are sorted to the fourth takeaway chute and transferred to a fourth carton sortation zone via a fourth conveyor.

13. The system of claim 12, wherein the first and second conveyors are aligned vertically as they leave the manual sort center, and the third and fourth conveyors are aligned vertically as they leave the manual sort center.

14. The system of claim 13, wherein each of the takeaway chutes are positioned perpendicular to a respective conveyor.

15. The system of claim 6, wherein the distal end of the primary conveyor has an automated diverter arm configured to automatically divert parcels and cartons down to a designed sorting platform of the plurality of sorting platforms.

16. A sorting center for sorting outbound parcels and cartons comprising:
    a center walkway;
    a plurality of sorting stations elevated from the center walkway;
    a plurality of infeed chutes for automatically diverting the outbound parcels and cartons down one of the plurality of infeed chutes to a designated sorting station;
    a plurality of conveyors;
    a plurality of carton palletization zones;
    a plurality of takeaway chutes coupled to the plurality of conveyors and each conveyor terminates at a respective carton palletization zone;
    wherein the plurality of takeaway chutes have upper ends adjacent to the plurality of sorting platforms and lower ends feeding the plurality of conveyors, and the plurality of sorting platforms are positioned for a sorter to manually move the cartons from a respective sorting platform and down one of the plurality of takeaway chutes, and
    a small sorts lane conveyor positioned above the plurality of takeaway chutes and forward of the plurality of sorting platforms, wherein the small sorts lane conveyor transports parcels to a parcel final sortation zone via a parcels conveyor.

17. The sorting center of claim 16, wherein the plurality of takeaway chutes comprises a first takeaway chute positioned forward on a first side of the sorting platform, a second takeaway chute positioned forward on a second side of the sorting platform, a third takeaway chute positioned rearward on the first side of the sorting platform, and a fourth takeaway chute positioned rearward on the second side of the sorting platform.

18. A method of sorting using a semi-automated bulk sorting system comprising a primary conveyor having a proximate end and a distal end, a plurality of infeed chutes coupled between the distal end of the primary conveyor and a plurality of sorting stations in series along the primary conveyor with each infeed chute having an upper end connected along the primary conveyor and a lower end terminating at a designated sorting station of a plurality of sorting stations, a first takeaway chute of a plurality of takeaway chutes positioned forward on a first side of the designated sorting station, a second takeaway chute positioned forward on a second side of the designated sorting station, a third takeaway chute positioned rearward on the first side of the designated sorting platform, a fourth takeaway chute positioned rearward on the second side of the designated sorting station, a small sorts lane conveyor positioned above each of the takeaway chutes and forward of the plurality of sorting stations, and a plurality of carton palletization zones positioned downstream from the plurality of takeaway chutes and being configured to receive the sorted cartons via a respective conveyor in order to palletize the sorted cartons for delivery by a designated carrier, the method comprising:
    receiving a plurality of parcels at the plurality of sorting stations; and
    moving each of the plurality of parcels to one of the plurality of takeaway chutes or the small sorts lane conveyor.

* * * * *